United States Patent [19]
Stillman

[11] Patent Number: 5,375,305
[45] Date of Patent: Dec. 27, 1994

[54] HONEYCOMB EXPANDER MECHANISM

[75] Inventor: Ben Stillman, Cupertino, Calif.

[73] Assignee: Supracor Systems, Inc., Sunnyvale, Calif.

[21] Appl. No.: 177,702

[22] Filed: Jan. 4, 1994

Related U.S. Application Data

[63] Continuation of Ser. No. 916,589, Jul. 20, 1992.

[51] Int. Cl.$^5$ ............................................. B29C 55/00
[52] U.S. Cl. ............................................. 26/51; 26/71; 26/87; 156/197
[58] Field of Search ................... 26/51, 52, 53, 71, 73, 26/80, 85, 88, 91, 92, 87, 96; 428/116, 118; 156/197, 494, 495, 496; 264/177.12, DIG. 81

[56] References Cited

U.S. PATENT DOCUMENTS

| | | | |
|---|---|---|---|
| 148,121 | 3/1874 | Henderson | 26/53 |
| 763,415 | 6/1904 | McLean | 26/53 |
| 1,732,089 | 10/1929 | Honeyman, Jr. et al. | 26/91 |
| 3,999,507 | 12/1976 | Voerman | 26/51 |
| 4,250,684 | 2/1981 | Clegg | 53/157 |
| 4,435,941 | 3/1984 | Booth et al. | 53/475 |
| 4,584,821 | 4/1986 | Booth | 53/448 |
| 4,862,564 | 9/1989 | Kwack | 26/92 |
| 4,890,365 | 1/1990 | Langer | 26/73 |
| 5,039,567 | 8/1991 | Landi et al. | 428/116 |
| 5,081,751 | 1/1992 | Pettigrew | 26/91 |

Primary Examiner—Clifford D. Crowder
Assistant Examiner—Amy B. Vanatta
Attorney, Agent, or Firm—Claude A. S. Hamrick

[57] ABSTRACT

A honeycomb manufacturing expander mechanism which includes a cam or guide plate having two sets of guide slots respectively extending outwardly in opposite directions away from a center portion of the plate. The inboard ends of the slots in each set are equally spaced from each other. In extending outwardly, the slots in each set converge such that the spacing between the outboard ends of each slot is less than that of the inboard ends. Disposed beneath the plate are a pair of mutually parallel bars, each carrying a plurality of expander pins which extend upwardly through corresponding slots in the plate. The bars are movable in concert from positions beneath the inboard ends of the slots to positions beneath the outboard ends of the slots by one or more motor-driven lead screw drives. As the bars are moved outwardly from the central portion of the plate, the slots guide the pins to cause the pitch, or spacing, between the respective pins in each set to decrease in a substantially uniform manner, so that by placing the opposite edges of a stagger-bonded stack of ribbons in engagement with the pins of each set, movement of the bars outwardly will cause the stack to be expanded into a uniform honeycomb configuration.

16 Claims, 5 Drawing Sheets

HONEYCOMB EXPANDER MECHANISM

This is a continuation of copending application Ser. No. 07/916,589 filed on Jul. 20, 1992.

BACKGROUND OF THE INVENTION

1. Field of the Invention

The present invention relates generally to honeycomb manufacturing apparatus and more particularly to a mechanical apparatus for expanding a stack of stagger-bonded ribbon to create a sheet or panel of honeycomb.

2. Brief Description of the Prior Art

The term "honeycomb" is often used to describe an open-celled structure similar to a bee's honeycomb. This term, however, is not generally limited to a structure made of hexagonally shaped and interconnected open cells and usually extends to include a structure made of other shapes of interconnected cells as well. For example, such cells could be square, rectangular or six-sided, and are not limited to the hexagonal configuration. Accordingly, it is this extended meaning that will be attached to the term "honeycomb" as used in this specification.

Typically, a panel of honeycomb is made by first placing rectangular sheets of material on top of one another to form a stack. As an individual sheet is placed it is bonded to the sheet below it by means of parallel, equally spaced-apart lines of bonding which extend across the entire surface of the sheet. The lines of bonding of every subsequent sheet are formed directly above the spaces between the lines of bonding of each previous sheet. This process is known as stagger-bonding.

Once a stack of sheets has been formed it is sliced, in direction perpendicular to the direction of the lines of bonding, into narrow strips to form a stack of stagger-bonded ribbons. These strip stacks are then expanded in a direction transverse to the planes of the individual ribbons, to form the panel of honeycomb.

One recent implementation of this technique has been to expand stagger-bonded ribbons of flexible material to form the cores for resilient honeycomb pads and the like. (See, for example U.S. Pat. No. 5,039,567). The expansion has typically been achieved by hand with a technician hooking each side of the material to be expanded over pins arrayed along the side of a stretcher plate. Such manual technique is both inefficient and expensive.

Another problem with manual honeycomb expansion methods is that, from a practical standpoint, only elastic or pliable materials are suitable for being expanded by hand. As a consequence, stiff or brittle materials are not usually made into honeycomb using the stagger-bonded ribbon technique as there has heretofore been no convenient way to expand the rigid and sometimes fragile bonded ribbons into open-celled sheets. However, many such materials are desirable for some types of honeycomb applications because of their strength-to-weight ratio. Since some of these desirable materials become pliable when exposed to heat, it would be advantageous to have means available which could simultaneously heat the ribbons and expand or stretch them into the open-celled honeycomb configuration.

Historically, honeycomb expanders have been used in conjunction with food-packaging machinery. For example, U.S. Pat. Nos. 4,435,941, 4,250,684 and 4,584,821 disclose machinery for packaging fruit into expanded honeycomb-filled containers. Such apparatus typically uses suction to engage the outer ribbons to effect the expansion operation and hold the honeycomb open until fruit is inserted. While appropriate for some applications, the use of vacuum mechanisms of this type would be unnecessarily complex and, in some cases unworkable and expensive, method of expanding honeycomb. For example, whereas the honeycomb dividers used for food packing are large in size and have large cell structure making the use of vacuum apparatus practical, honeycomb materials used in many other applications often have quite small cell structures. To use suction as a means of engagement in an expander for small-celled honeycomb would be very difficult because, among other things, of the need to vary the pitch of the suction points during the expansion process.

SUMMARY OF THE INVENTION

It is therefore a principal objective of the present invention to provide a mechanism for uniformly expanding stagger-bonded ribbons of material to provide a sheet or panel of honeycomb.

Another objective of the present invention is to provide an apparatus of the type described that will controllably expand the honeycomb and assure that all cells are substantially equal in size and shape.

Another objective of the present invention is to provide a mechanism for expanding honeycomb that can be used in conjunction with a direct heat source so that bonded strips of stiff or brittle thermo-setting materials can be controllably expanded into honeycomb.

Still another objective of the present invention is to provide a mechanical assembly that expands heated honeycomb material and then transfers the honeycomb to a separate plate for cooling and hardening.

Briefly, a preferred embodiment of the present invention provides for a honeycomb expander mechanism which includes a base plate having two sets of guide slots respectively extending outwardly in opposite directions away from a center portion of the plate. The inboard ends of the slots in each set are equally spaced from each other at intervals which are an integer multiple of the strip bonding pitch. In extending outwardly, the slots in each set converge such that the spacing between the outboard ends of each slot provides the desired honeycomb pitch and is again equal but less than that of the inboard ends so as to accommodate the dimensional contraction of the honeycomb pitch as it is expanded. Disposed beneath the plate are a pair of mutually parallel bars, each carrying a plurality of expander pins which extend upwardly through the corresponding slots in the plate. The bars are movable in concert from positions beneath the inboard ends of the slots to positions beneath the outboard ends of the slots by one or more motor-driven lead screw drives. As the bars are moved outwardly from the central portion of the plate, the slots guide the pins to cause the pitch, or spacing, between the respective pins in each set to decrease in a substantially controlled and uniform manner, so that by placing the opposite edges of a stagger-bonded stack of ribbons in engagement with the pins of each set (positioned proximate the center of the plate), movement of the bars outwardly will cause the stack to be expanded into a honeycomb configuration of uniformly configured cells.

The apparatus of the present invention may be used to expand stacks of stagger-bonded elastic or thermo-setting materials. Where the ribbon consists of the latter materials, a heat source may be used to warm the stiff ribbon prior to and/or during the expansion thereof to make it pliable. Following the expansion phase, the expanded honeycomb may be transferred to a transfer plate for cooling.

An important advantage of the present invention is that it provides a controlled, variable-speed, efficient and economical apparatus for expanding stagger-bonded ribbon stacks into sheets of honeycomb.

Another advantage of the present invention is that it provides for uniform expansion which results in repeatable honeycomb cell size.

A further advantage of the present invention is that it provides an apparatus which can produce a honeycomb structure with uniformly shaped cells that may be of regular configuration or may be symmetrically over-expanded or under-expanded.

Yet another advantage of the present invention is that it can operate in conjunction with a direct heat source to uniformly expand brittle materials that must be kept heated in order to be pliable.

Still another advantage of the present invention is that it can be computer driven to accurately control expansion rate in conjunction with the temperature of the honeycomb material.

Yet another advantage of the present invention is that it may include means for transferring heated and expanded honeycomb from the expander unit to a separate transfer plate for cooling and further processing.

These and other objects and advantages of the present invention will no doubt become apparent to those skilled in the art after having read the following detailed description of the preferred embodiment which is illustrated in the several figures of the drawing.

DETAILED DESCRIPTION OF THE PREFERRED EMBODIMENT

Figure 1:
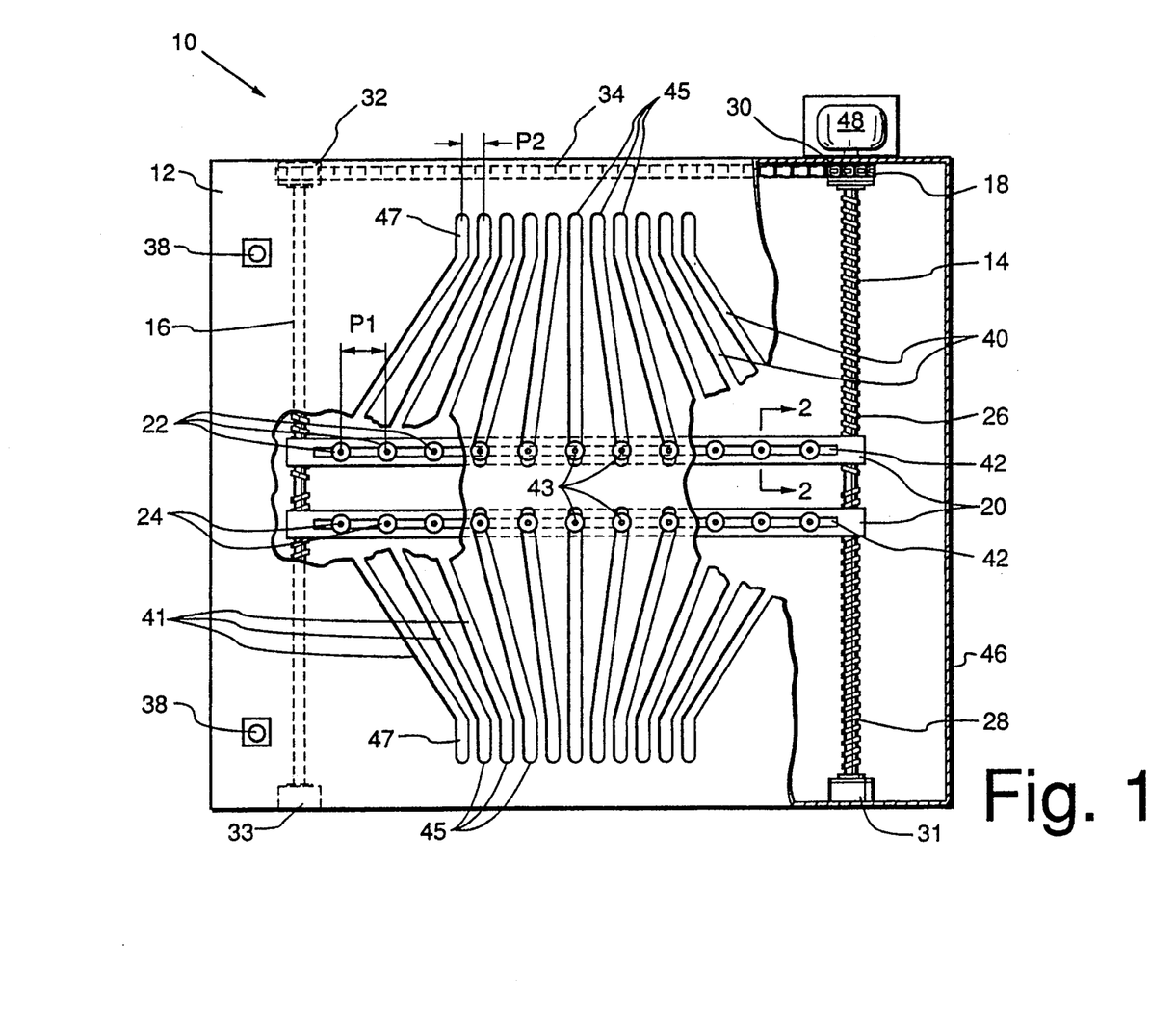
FIG. 1 is a partially broken top view showing an expander mechanism in accordance with the present invention.

Referring now to FIG. 1 of the drawing, a top view of an expander mechanism 10 in accordance with the present invention is shown to include a cam or guide plate 12 partially broken away to illustrate operative components lying beneath it. Such components include a pair of threaded lead screws 14 and 16, a chain and sprocket assembly 18 drivably coupling the lead screws together, a pair of pin-carrier bars 20 threadably coupled to the lead screws 14 and 16, a plurality of spools 22 with associated expander pins 24, and a motor 48 for rotatably driving the lead screw 14 and, through assembly 18, the lead screw 16. Each lead screw has a left-hand thread on one half and a right-hand thread on the other half so that when the lead screws are rotated in one direction, the carrier bars 20 move outwardly away from each other, and when they are rotated in the opposite direction, the carrier bars 20 move inwardly toward each other.

Plate 12 includes two sets of guide slots 40 formed therein with each set including a plurality of slots extending in opposite directions away from a midportion of the plate 12 to mutually opposite sides thereof. The inboard ends 43 of the slots 40 in each set are equally spaced from each other, and the slots 40 in each set converge towards a point outward from the central portion of the plate such that the spacing between the outboard ends 45 of each slot 40 are again equal but less than that of the inboard ends 43. As will be more fully explained below, the outboard ends of the slots 40 are configured with slight dogleg segments 47 extending parallel to each other. As illustrated in FIG. 1, the spacing, or pitch, of the inboard slot ends is designated $P_1$, and the spacing or pitch of the outboard slot ends is designated $P_2$. As will be further described below, the lengths of the slots and the pitches $P_1$ and $P_2$ are predetermined for a particular cell type to accommodate the material contraction during cell expansion.

Figure 2:
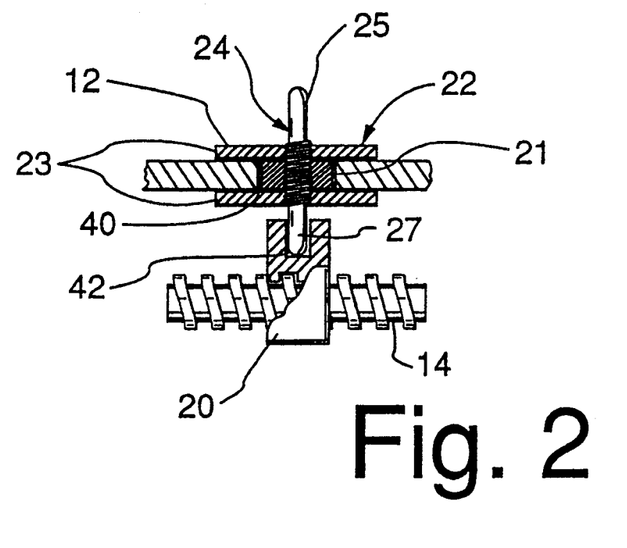
FIG. 2 is a partial cross-section taken along the line 2—2 of FIG. 1.

Turning now additionally to FIG. 2 of the drawing, which is a cross-section taken along the line 2—2 of FIG. 1, it will be noted that the spools 22 are constituted by a bushing 21 and a pair of washers 23, all of which are internally threaded to mate with external threads formed on the midportion of the shaft forming a pin 24. Note that the upper end 25 of pin 24 extends upwardly from, and normal to, plate 12 so as to be properly oriented to engage a stack of stagger-bonded ribbons placed on the guide plate 12. The lower pin end 27 extends downwardly to be received within a slot 42 formed in the pin carrier bar 20. The outer diameter of bushing 21 is selected to have a predetermined tolerance relative to the width of the guide slot 40. The washers 23 serve to maintain the bushing 21 within the guide slot 40 and keep the pin 25 generally perpendicular to the surface of plate 12. Note that, as indicated in FIG. 1, the lower pin end 27 is free to move within slot 42 of bar 20 as the pin assembly is moved along the plate slot 40.

Figure 3:
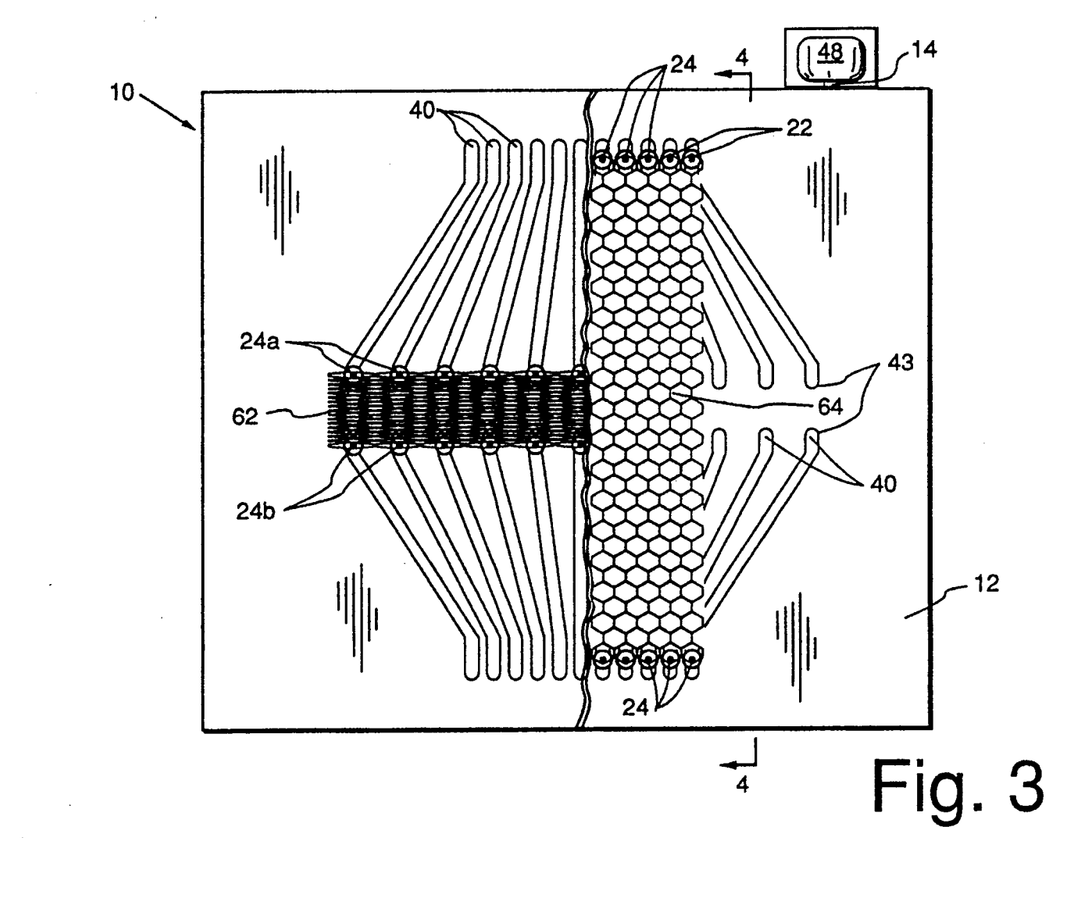
FIG. 3 is a broken top view of the mechanism of FIG. 1 illustrating both pre-expansion and post-expansion engagement of the mechanism with honeycomb material.

In FIG. 3 of the drawing, the operation of basic embodiments of the present invention is illustrated. To prepare the apparatus for use, the motor 48 is energized to drive the pin-carrier bars 20 and associated spools and pins into position proximate the inboard ends 43 of the slots 40. The stack of stagger-bonded ribbons 62 is then placed between the two sets of pins, 24a and 24b, with the planes of the ribbons being generally perpendicular to the face of the guide plate 12. The outermost ribbon on each side of the stack is then hooked over the pins, with individual pins being located in separate cells formed between the outermost two ribbons and two adjacent bonding lines. The motor 48 is then reversed to rotate lead screws 14 and 16 in the opposite direction causing the carrier bars 20 to move outwardly driving the pin assemblies outwardly to expand the ribbons into the cellular honeycomb configuration illustrated as 64.

It will be apparent that as the stack of ribbons is expanded to form a panel of honeycomb, the change in shape of each individual cell, from a substantially flat pocket to an open-celled structure, will cause the length of the stack being expanded to contract longitudinally and normal relative to the direction of the expansion. To prevent distortion of the panel from occurring, uniform allowance for this contraction must be made. This is achieved partially by the manner in which the expander pins 24 are mounted to the pin carrier bars 20. This mounting allows the expanded pins 24 freedom of movement in the longitudinal direction of the carrier bars 20. It is, however, also important to ensure a uniform spacing between the expander pins 24 as they are moved outwardly so that a uniform opened-celled honeycomb structure is formed. It is for this reason that the converging guide slots 40 are provided. The degree of convergence of these slots corresponds with the degree of lateral contraction of the panel of honeycomb material as it is expanded over the guide plate 12. The guide slots 40 therefore serve to control the convergence of the expander pins 24 towards each other as the pin-carrier bars 20 move away from one another. With the guide slots so configured it is possible to achieve minimal or no distortion of the panel of honeycomb material and thereby achieve a substantially uniform open-cell configuration.

The spacing $P_1$ between the expander pins 24 at the inboard ends of the guide slots 40 corresponds with the spacing between the centers of the collapsed pockets which, once expanded, will form the open-cell structures. Similarly the spacing $P_2$ between the expander pins 24 when they have reached the outboard ends of the guide slots 40 corresponds with the desired spacing between the centers of two adjacent, fully-expanded open-celled structures.

It will be apparent from the above that the degree of over-or under-expansion of the honeycomb structure being produced is dependent on the spacing between the carrier bars 20 at the end of a given expansion process. As the expander pins are always maintained at uniform spacing, relative to one another, through their transition between the inboard and outboard ends of the guide slots 40, the honeycomb 64 has a uniform configuration during the entire expansion process. Thus, the size of the cells in the honeycomb can be controlled by stopping the expansion process at any desired time without affecting the uniformity of the honeycomb 64.

Once the honeycomb panel has been expanded, it may be either processed in situ or off-loaded to a transfer plate as will be further illustrated below with reference to FIG. 5.

Figure 4:
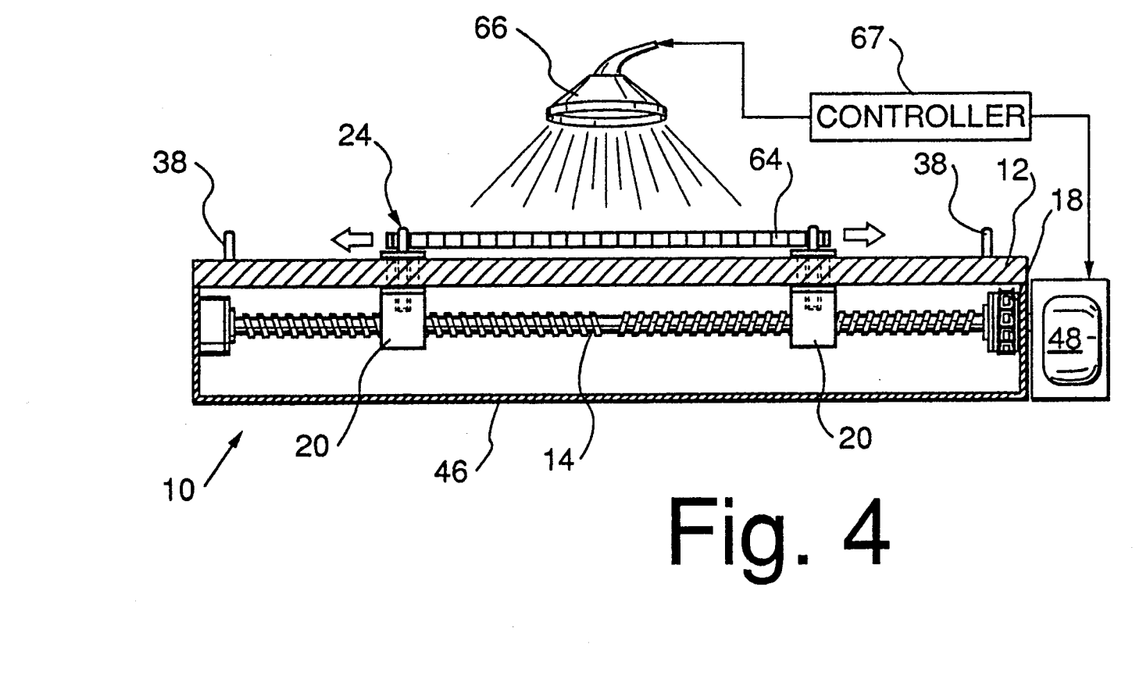
FIG. 4 is a cross-sectional side view taken along line 4—4 in FIG. 3, illustrating apparatus for heating the honeycomb during an expansion operation.

Referring to FIG. 4, an illustration is provided as to how a direct heat source 66 may be used in conjunction with the expander mechanism 10. In this Figure, a simple heat lamp is depicted. However, it will be apparent that other types of heat sources may be utilized. Also shown is a controller 67 which coordinates the application of heat with the actuation of drive motor 48. The heat may be applied to a strip of rigid, stagger-bonded ribbons 64 (which would otherwise not be pliable), loaded onto the center portion of plate 12 and installed over the pin 24 as previously described, until the material becomes pliable to allow it to be expanded. Depending upon the type of heat source used and the material in question, the heat may be applied throughout the expansion process to ensure a uniform expansion and thus uniform cell size. However, in some cases it may be appropriate to intermittently energize the lamp as a way of allowing selective control of the heat applied. Once the expansion phase is completed, the heat source 66 is de-energized and perhaps removed, and the honeycomb 64 is allowed to harden as it cools.

Figure 5:
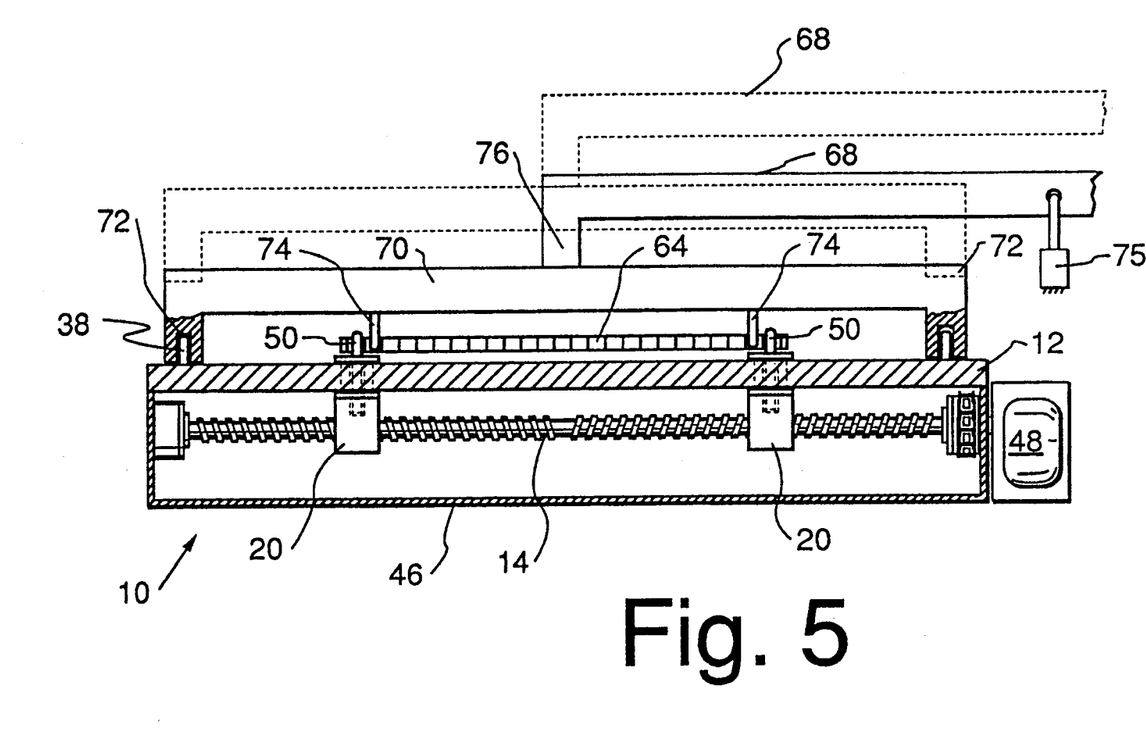
FIG. 5 is a partially broken side view illustrating a transfer mechanism for transferring an expanded honeycomb from the expander mechanism of the present invention.

FIG. 5 illustrates an additional feature of the present invention which includes a transfer assembly 68 for removing the expanded honeycomb 64 from the mechanism 10 while maintaining it in an expanded condition, away from the expander mechanism, during the cooling and/or subsequent processing phase. This feature allows the expander mechanism 10 to be used almost continuously without delays to accommodate cooling.

The transfer assembly, generally indicated as 68, includes a transfer plate 70 having down-turned legs 69 with alignment bores 72 formed to receive the alignment pins 38 which, as previously indicated, extend upwardly from plate 12. It further includes two rows of stationary transfer pins 74 fixed to the underside of plate 70 and having the same spacing as pitch setting $P_2$ on the expander mechanism. An actuator 75 and an arm 76 attached to the upper surface of plate 70 provide a means for lifting plate 70 and its carried honeycomb out of engagement with the expander 10.

After a strip of rigid ribbon is heated and expanded, and the heat source 66 removed, the transfer assembly 68 is moved into the position shown in broken lines over the expander mechanism 10, and is lowered into position engaging four alignment pins 38 on the plate 12. This ensures correct alignment of the transfer plate 70 relative to guide plate 12. It also ensures that the transfer pins 74 are correctly aligned and ready to engage particular cells of the expanded honeycomb 64.

As the assembly 68 is lowered into position, each set of the transfer pins 74 will be located within a row of open cells on opposite sides of the expanded honeycomb 64. The pins 74 will be offset from corresponding expander pins 24 and located in the same cells or adjacent cells. The motor 48 is then momentarily activated to move the carrier bars 20 slightly toward each other until the honeycomb shrinks into engagement with the pins 74 which then hold the honeycomb in its expanded position allowing the expander pins 24 to disengage the honeycomb. Actuator 75 can now be energized to lift plate 70 and complete transfer of the honeycomb 64 from the expander mechanism 10.

One of the reasons that the guide slots 40 are formed with the dog-legged, parallel segments 47 at their outboard ends is to make allowance for the slight retraction of pins 24. However, when the expander pins 24 are moved slightly inwards to transfer the honeycomb material to the transfer pins 74, a slight retraction of the honeycomb panel 64 occurs. This retraction is enough to correct the over-extended configuration of the panel. The dog-legged segments 47 are dimensioned to be long enough to allow this retraction to take place in a direction perpendicular to the longitudinal axis of the carrier bars. This, in turn, ensures that the honeycomb structure does not distort during the retraction process. The other reasons for having guide slots 40 formed with the dog-legged, parallel segments 47 at their outboard ends are to permit planned over-or under-expansion of cells and to allow for more or less ribbons (i.e., a larger or smaller stack), thus accommodating various panel sizes within the dogleg limits.

Upon completion of the off-loading operation, the transfer assembly 68 is lifted back up to the position shown in dashed lines and then clear of the expander mechanism 10. After the transfer assembly 68 has been retracted, the expander mechanism 10 is reset to receive another stack of bonded ribbon. Although a particular transfer assembly 68 is described for use with honeycomb of a fully expanded configuration, different assemblies, all using the same principles, can be designed to off-load honeycomb with any expansion configuration.

Although the present invention has been described above in terms of a specific embodiment, it is anticipated that alterations and modifications thereof will no doubt become apparent to those skilled in the art. It is therefore intended that the following claims be interpreted as covering all such alterations and modifications as fall within the true spirit and scope of the invention.

What is claimed is:

1. An expander mechanism for expanding a stack of stagger-bonded, parallel disposed ribbons of material to form a uniform honeycomb structure, comprising:
   a planar substrate having a first plurality of guide slots formed therein and extending outwardly in a first general direction from a mid-portion of said substrate, and a second plurality of guide slots formed therein and extending outwardly from said mid-portion in a second direction opposite to said first direction, a spacing between at least portions of the respective slots in each said plurality decreasing uniformly as a function of a distance from said mid-portion;
   material engaging means associated with each said guide slot and moveable along paths defined thereby; and
   drive means for causing said material engaging means to move along said guide slots outwardly from a position proximate said mid-portion, whereby bonded ribbons of material engaged by said engaging means may be expanded to form a honeycomb structure.

2. An expander mechanism as recited in claim 1 wherein said material engaging means include a plurality of expander pins, each extending upwardly through one of said guide slots so that an outer ribbon of said stack may be engaged thereby.

3. An expander mechanism as recited in claim 2 wherein said drive means includes elongated first and second bars disposed in parallel relationship to each other beneath said substrate and movable towards and away from each other, each said bar being adapted to slidably engage a row of said pins such that movement of said bars beneath said substrate causes the pins to move along said guide slots.

4. An expander mechanism as recited in claim 3 wherein said drive means further includes a motor and a drive linkage associated therewith for moving said bars beneath said substrate.

5. An expander mechanism as recited in claim 4 wherein said drive linkage includes at least one lead screw threadably engaging threaded bores in said bars and drivable by said motor such that rotation of said lead screw in one direction moves said bars away from each other, and rotation of said lead screw in the opposite direction moves said bars toward each other.

6. An expander mechanism as recited in claim 1 wherein the guide slots in each said plurality include first segments which converge in the outward direction and second segments at the ends of said first segments which extend parallel to each other.

7. An expander mechanism as recited in claim 1 and further including a heat source for applying heat to material expanded by said mechanism.

8. An expander mechanism as recited in claim 2 for removing an expanded honeycomb structure from said mechanism and further comprising a transfer assembly including a rigid structure having a plurality of downwardly extending transfer pins disposed in two spaced apart rows and positioned to generally correspond with the positions of said expander pins when said expander pins are at a position of maximum expansion of a particular honeycomb structure so that, when said transfer assembly is moved into engagement with an expanded honeycomb structure, a transfer to the pins thereof can be effected by a slight retraction of said expander pins.

9. An expander mechanism as recited in claim 8 and further including alignment means for aligning said transfer assembly with said substrate as it is moved into engagement with said honeycomb structure.

10. An expander mechanism for expanding a stack of stagger-bonded parallel disposed ribbons of material to form a honeycomb structure, comprising:
    a planar substrate having a plurality of guide slots formed therein and extending laterally relative to a first dimension of said substrate;
    material engaging means associated with said guide slots and including a first elongated positioning bar and a second elongated positioning bar disposed in parallel relationship to each other, at least one of said bars being movable relative to the other, each having a plurality of material engaging components disposed along the length thereof and movable relative to each other in the direction of the length of the associated positioning bar;
    means for constraining said first and second positioning bars such that at least one bar moves in parallel relative to the other in a direction normal to said first dimension of said planar substrate; and
    drive means for causing at least one bar to move outwardly relative to the other, whereby said ribbons of material engaged by said engaging means may be expanded to form a honeycomb structure.

11. An expander mechanism for expanding a stack of stagger-bonded ribbons into a panel of honeycomb comprising:
    drive means;
    a pair of rigid, elongate, carrier bars, arranged parallel to each other with each bar including an upwardly open, elongate axial slot formed therein, the carrier bars being linked to the drive means so that operation of the drive means causes the carrier bars to move relative to one another to change the transverse spacing between them while at the same time maintaining the bars parallel to one another;
    a plurality of upstanding expander pins slidably mounted within the axial slots of the carrier bars and orientated substantially perpendicular to the longitudinal axis of the carrier bars; and
    spacer means for causing the spacing between said pins to vary as said carrier bars are moved relative to each other while maintaining a substantially uniform spacing between each pin in the axial slots, said spacer means including at least two sets of guide slots extending generally transverse to the longitudinal axis of the carrier bars, one set of said guide slots being associated with each carrier bar, the guide slots being configured to receive at least some of the expander pins and to cause the expander pins in each carrier bar to converge as the carrier bars are moved apart by the drive means.

12. An expander mechanism as set forth in claim 11 wherein said spacer means includes a support plate in which is formed said two sets of guide slots.

13. An expander mechanism as set forth in claim 11, wherein the drive means includes a motor and lead screw means threadably engaging said carrier bars, wherein operation of the motor causes the lead screw means to rotate and drive the carrier bars relative to one another.

14. An expander mechanism as set forth in claim 13, wherein the lead screw means is configured with left-hand threads along one portion of the length thereof for engaging one of the carrier bars, and with right-hand threads along another portion of the length thereof for engaging the other of the carrier bars such that rotation of the lead screw means in one direction causes the carrier bars to move apart from one another and rotation in the opposite direction causes the carrier bars to move toward one another.

15. An expander mechanism as set forth in claim 11 including a heat source for heating the stack of stagger-bonded ribbons during the expanding process.

16. An expander mechanism as set forth in claim 11 and further comprising a transfer means for transferring an expanded panel of honeycomb from the expander pins to a remote location, the transfer means including:
 a support; and
 a plurality of transfer pins attached to said support and arranged in two parallel lines and spaced apart so as to mirror the arrangement of the expander pins when said expander pins are positioned with the panel of honeycomb in an expanded configuration.

* * * * *